(12) United States Patent
Bryan et al.

(10) Patent No.: US 10,983,785 B1
(45) Date of Patent: Apr. 20, 2021

(54) FIRMWARE UPDATING OF POWER UNITS

(71) Applicant: Amazon Technologies, Inc., Seattle, WA (US)

(72) Inventors: David Edward Bryan, Seattle, WA (US); Ligong Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/022,298

(22) Filed: Jun. 28, 2018

(51) Int. Cl.
*H02J 9/06* (2006.01)
*G06F 8/65* (2018.01)
*G06F 9/445* (2018.01)
*H04L 29/06* (2006.01)

(52) U.S. Cl.
CPC ............ *G06F 8/66* (2013.01); *G06F 9/44505* (2013.01); *H04L 63/04* (2013.01)

(58) Field of Classification Search
CPC ....... G06F 8/66; G06F 9/44505; H04L 63/04; H02J 9/06
See application file for complete search history.

(56) References Cited

U.S. PATENT DOCUMENTS

| | | | | |
|---|---|---|---|---|
| 9,098,278 B1* | 8/2015 | Nay | ...................... | G06F 1/3212 |
| 2003/0063742 A1* | 4/2003 | Neufeld | ................ | H04L 9/0662 |
| | | | | 380/46 |
| 2008/0086652 A1* | 4/2008 | Krieger | ...................... | G06F 1/26 |
| | | | | 713/330 |
| 2008/0301493 A1* | 12/2008 | Horiuchi | ............. | G06F 11/1471 |
| | | | | 714/6.11 |
| 2014/0081940 A1* | 3/2014 | Everett | ................ | H02J 7/0004 |
| | | | | 707/705 |
| 2014/0101464 A1* | 4/2014 | Hsiao | ...................... | G06F 1/263 |
| | | | | 713/300 |
| 2015/0380968 A1* | 12/2015 | Lee | ......................... | H02J 9/061 |
| | | | | 713/300 |
| 2016/0226262 A1* | 8/2016 | Fukubayashi | ....... | H01M 10/425 |
| 2016/0378990 A1* | 12/2016 | Goodman | ............. | G06F 21/572 |
| | | | | 726/19 |
| 2018/0365449 A1* | 12/2018 | Meriac | .................. | H04L 9/0861 |
| 2019/0129401 A1* | 5/2019 | Chai | .................... | G06F 9/44505 |

OTHER PUBLICATIONS

Schneider Electric, "Command Line Interface Guide UPS Network Management Card 2", Oct. 2015 (Year: 2015).*
Schneider Electric, "User Guide UPS Network Management Card 2", Oct. 2015 (Year: 2015).*

* cited by examiner

*Primary Examiner* — Hang Pan
*Assistant Examiner* — Noor Alkhateeb
(74) *Attorney, Agent, or Firm* — Kilpatrick Townsend & Stockton LLP

(57) ABSTRACT

Information about firmware modules for a power unit (e.g., a battery backup unit or a power supply unit) can be downloaded, along with the firmware modules themselves. The firmware modules, which may constitute less than a complete firmware re-flash, can be used to update firmware of the power unit from a first version type to a second version type.

19 Claims, 7 Drawing Sheets

FIRMWARE UPDATING OF POWER UNITS

BACKGROUND

Typically, battery backup units—such as those configured to provide supplemental power to computer servers in the event of a power shortage—require firmware for correct operation. Once the unit is installed, a complete re-flash of firmware on a battery backup unit may be difficult due to various reasons. For example, if something were to go wrong in the firmware update, the entire battery backup unit could be ruined. Additionally, doing the complete re-flash may require the battery backup unit to be offline for an extended period of time.

BRIEF DESCRIPTION OF THE DRAWINGS

Various examples in accordance with the present disclosure will be described with reference to the drawings, in which.

DETAILED DESCRIPTION

Figure 1:
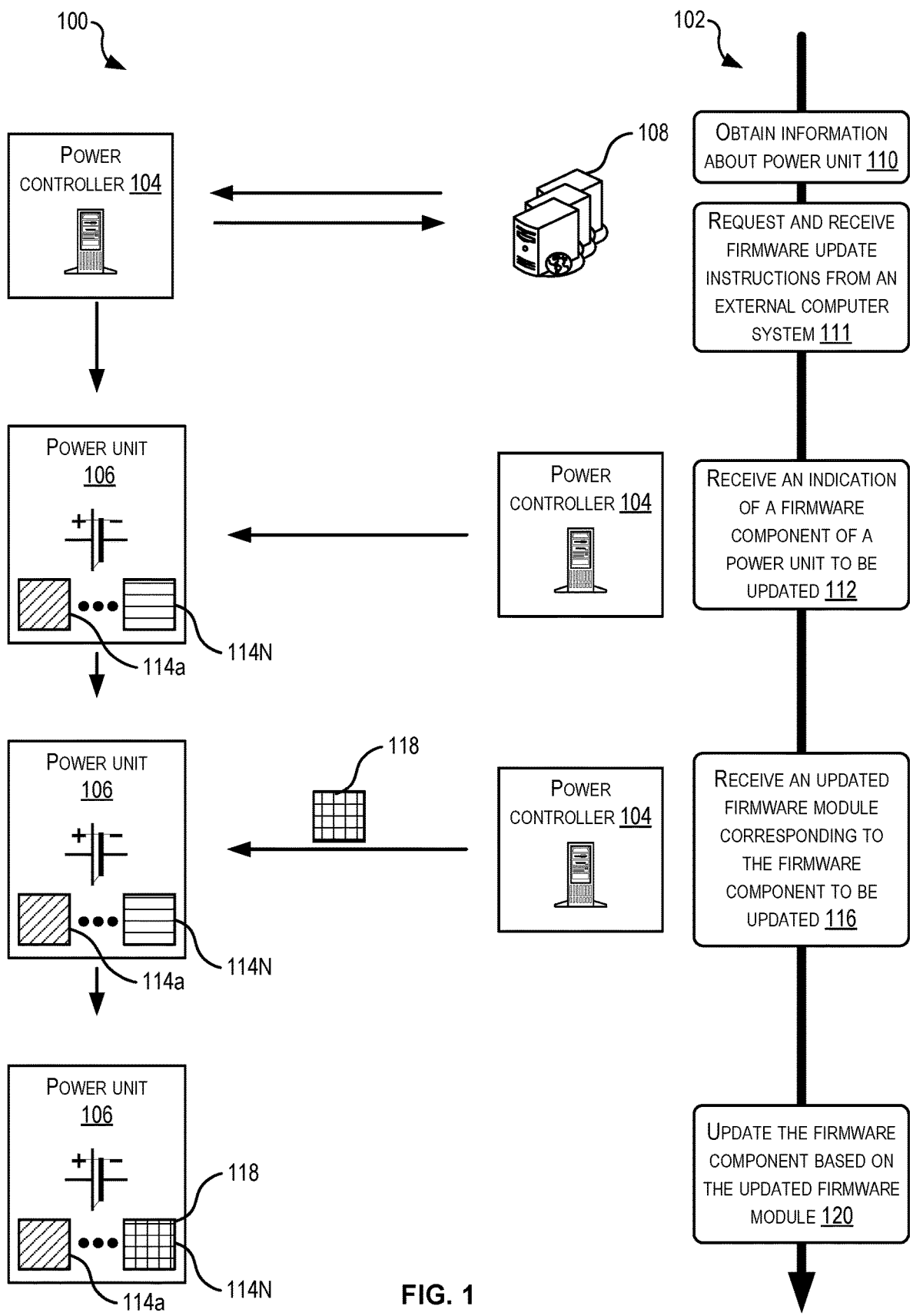
FIG. 1 is an example block diagram and associated flowchart showing a process for implementing techniques relating to updating portions of firmware on power units, according to at least one example.

Examples described herein are directed to, among other things, techniques for selectively updating portions of firmware of a power unit (e.g., a battery backup unit, power supply unit, or other device configured to provide power to a server computer). Instead of a complete replacement of the firmware, portions such as those that store configuration data for a battery operation algorithm (e.g., gauge algorithm, control algorithm, safety algorithm, etc.) can be identified and quickly updated. In some examples, the time needed to do such a partial update to the firmware (e.g., 10 seconds) may be much less than the time needed to do the complete replacement (e.g., 10 minutes). Thus, the power unit may be offline for an acceptable amount of time. A system to implement these techniques may be implemented at a rack level. For example, each rack may include a shelf that supports various computing devices relating to powering the server computers of the rack and, in some examples, those of other racks. This shelf may be referred to as a power shelf. The power shelf may be configured to receive firmware updates from an external computing system (e.g., over a network connection), store the firmware updates, and enable power units of the power shelf to apply the firmware updates.

Turning now to a particular example, a system is provided that includes a power shelf configured to provide power to a server computer. The power shelf can include a power shelf controller and a power unit such as a battery backup unit. The power shelf controller can download a firmware module corresponding to a portion of firmware for the battery backup unit. The battery backup unit can receive the firmware module from the power shelf controller, determine to which portion of the firmware it applies, and load the firmware module as appropriate. For example, the firmware module may correspond to a configuration parameter of the battery backup unit that is stored in the firmware. For example, the configuration parameter may include operating and maximum and minimum voltages, operating and maximum and minimum temperatures, operating and maximum and minimum current values, operating and maximum and minimum power values, and other such configuration parameters. Updating the firmware module may update the configuration parameter from a first state to a second state. This update to the configuration parameter may adjust the operation of the battery backup unit.

The techniques described herein improve the functioning of power units and the computer systems that manage firmware updates to power units. As an example, the techniques and systems described herein provide improved safety by limiting the potential downtime for a power unit for updating. For example, because certain portions of the firmware are selected for updating while others are not, the power unit may be offline for less time than in conventional systems.

While the firmware updating techniques of this specification are described with reference to updating firmware in power units, they are equally applicable to updating firmware of other components of a power computer system (e.g., power controllers such as power shelf controllers and power supply controllers, management components such as baseboard management controllers, switches such as automatic transfer switches, any other suitable component that includes firmware).

In the description herein, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Turning now to the figures, FIG. 1 is an example block diagram 100 and associated flowchart showing a process 102 for implementing techniques relating to updating portions of firmware on power units, according to at least one example. The diagram 100 depicts a power controller 104, a power unit 106, and an external computing system 108 that interact to perform the process 102. In some examples, the process 102 can be performed by a firmware manager engine, which may be implemented by the power controller 104, the power unit 106, and/or the external computing system 108.

In some examples, the power controller 104 and the power unit 106 may be included in shelf of a server rack or in some other arrangement. For example, the shelf may include the power controller 104 that manages one or more power unit 106 of various types (e.g., power supply units and/or battery backup units). Each power unit 106 may be configured to provide power and/or backup power to a server within the server rack.

The external computing system 108 can be any suitable server component capable of interacting with the power controller 104 and/or the power unit 106 (e.g., in a client/server relationship). For example, the external computing system 108 may be a computer server, server cluster, distributed virtual server (e.g., cloud-based server), or any other combination of computing resources (e.g., processing, storage, networking, etc.) suitable for supporting techniques described herein relating to management of firmware updates. In some examples, the external computing system 108 may be used by an administrator to identify firmware updates that should be shared with the power controller 104 for the power unit 106.

The process 102 may begin at 110 by obtaining information about the power unit. This may include the power controller 104 requesting the information from the external computer system 108. In some examples, the information may indicate version information for firmware or firmware and hardware on the power unit 106, which may be shared between the power controller 104, the power unit 106, and the external computer 108. For example, the information may be stored in firmware database(s) at any one of the power controller 104, the power unit 106, and/or the external computer 108.

At 111, the process 102 may include requesting and receiving firmware update instructions from an external computing system. This may include the power controller 104 requesting the firmware update instructions from the external computing system 108. For example, the power controller 104 may periodically check in with the external computing system 108 to see if any updates are available for its power units 106. In some examples, the external computing system 108 pushes updates to the power controller 104. In some examples, the updates are distributed in a subscribe and publish arrangement between the power controller 104 and the external computing system 108.

At 112, the process 102 may include receiving an indication of a firmware component of a power unit to be updated. This may include the power controller 104 sending the indication to the power unit 106. In some examples, the power controller 104 may use the firmware update instructions to generate the indication of the firmware component. In some examples, the firmware component may be one of a plurality of firmware components 114a-114N that make up the firmware running on the power unit 106. A firmware component 114, which may constitute some portion of the firmware that is less than the complete firmware, may correspond to one or more configuration parameters of the power unit 106. The configuration parameters may include any control parameter, operating parameter, and the like that are used in controlling the operation of the power unit 106. The configuration parameters may include maximum values, minimum values, operating values, average values, conditional statements, and any other suitable value.

In some examples, as relating to a specification by which the power unit 106 operates, the configuration parameters may include: 1) measured voltage parameter, measured temperature parameter, and measured current parameter, measurement mechanism parameter (e.g., as part of function that can read voltage, temperature and current sequentially and provide the ADC value to convert a physical value); 2) calibration voltage parameter, temperature parameter, and current algorithm (e.g., to provide calibration method to calibrate voltage, temperature, and current in order to fit for accuracy specification); 3) a cell voltage parameter (e.g., as part of a balance function to activate to keep all cell voltages within acceptable range for performance and safety considerations); 4) power consumption data of server computers (e.g., as part of a ready function to get front end data); 5) chemical characteristic parameter, model name parameter, protection point parameter (e.g., as part a read or write function); 6) parameters for run mode, parameters for sleep mode, parameters for shutdown mode, parameters ranges for each of the modes (e.g., as part of a mode switching and judgement action); 7) fuse protection current parameter (e.g., as part of fuse protection function); 8) battery state of charge parameter, remaining charge parameter (e.g., as part of a battery gauge algorithm); 8) safety criterion parameters (e.g., as part of a safety and judgement function); 9) low voltage parameter (e.g., as part of a watchdog and low voltage detect function); 10) clock parameter, current recording parameter (e.g., as part of a real time clock control function); any other suitable parameter.

For example, when the power unit 106 is a battery backup unit, the configuration parameters may be parameters in a battery operation algorithm that is useable to manage the operation of the batteries of the battery backup unit. For example, configuration parameters of a battery gauge algorithm that outputs data about the operation of the battery may be updated. The configuration parameters may include critical parameters such as maximum power, total time the power component 106 can power a server computer, and other such parameters.

At 116, the process 102 may include receiving an updated firmware module corresponding to the firmware component to be updated. The firmware component may be the one that was identified at 112. This may include the power controller 104 sending the updated firmware module 118 corresponding to the firmware component 114N to the power component 106. In some examples, the firmware update instructions received by the power controller 104 at 111 may include the updated firmware module 118 or include location information indicating a storage location of the updated firmware module 118. In this latter example, the power controller 104 may access the storage location to retrieve the updated firmware module 118.

At 120, the process 102 may include updating the firmware component based on the updated firmware module. This may include the power component 106 using the updated firmware module 118 to update the firmware component 114. For example, the updated firmware module 118 may be used to replace the firmware component 114N. In some examples, updating the firmware component 114N may include updating the firmware component 114N from a first version to a second version.

Figure 2:
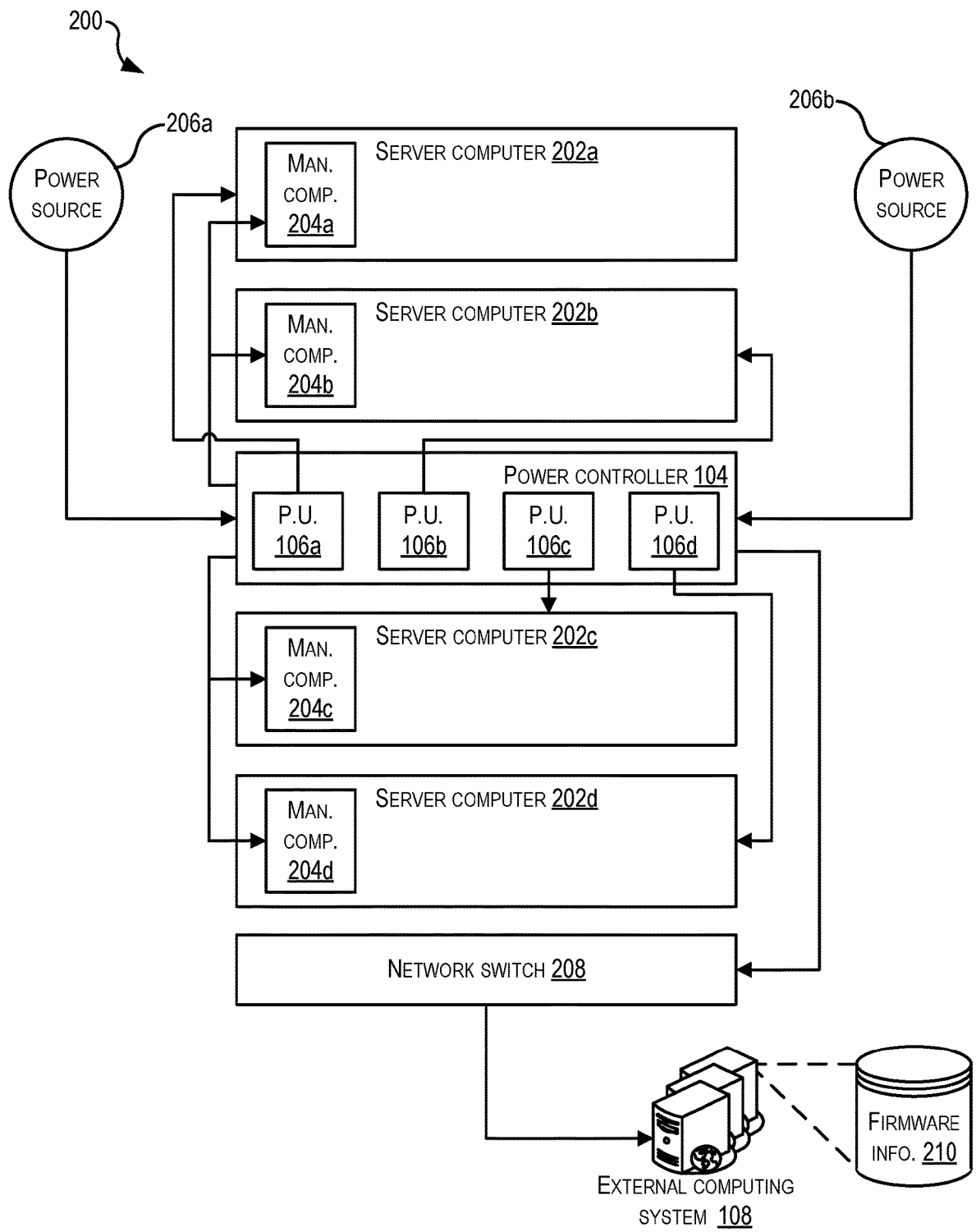
FIG. 2 is an example block diagram depicting an example system for implementing techniques relating to updating portions of firmware on power units, according to at least one example.

FIG. 2 illustrates an example block diagram depicting a system for implementing techniques relating to updating portions of firmware on power units, according to at least one example. The system 200 may be implemented at a rack-level, meaning as part of a small grouping of server computers 202. The system 200 may include a plurality of server computers 202a-202d. In some examples, a greater or fewer number of server computers 202 is included in the system 200. Each server computer 202 may include a management component 204a-204d. The management components 204 may include any suitable combination of software, firmware, and/or hardware configured to monitor and control elements of the server computers 202. In some examples, the firmware (e.g., portions of the firmware) on the management components 204 may be updated using the techniques described herein.

The power units 106 may represent power supply units (e.g., units configured to receive power from a power source such as an alternating power source and provide power to the server computers 202) and/or battery backup units (e.g., units configured to provide power to the server computers 202 in the event of a disruption to the power source). In some examples, each server computer 202 is powered by a single power supply unit and a single battery backup unit. In other examples, the power supply units and/or the battery backup units may be shared among the server computers 202. The power units 106 may be managed and monitored by the power controller 104.

The power controller 104 may include a module that is separate from the power units 106, but that is configured to manage power aspects of the power units 106 and the management components 204. When the power units 106 are power supply type power units, the power units 106 may receive power from at least one power source 206. In some examples, more than one power source 206 may be provided, e.g., two power sources 206a and 206b are illustrated. For example, a first portion of the power units 106 (e.g., 106a and 106b) may receive power from a first power source 206 (e.g., 206a) and a second portion of the power units 106 (e.g., 106c and 106d) may receive power from a second power source 206 (e.g., 206b). The power sources 206a, 206b may be cross-connected or may be entirely independent. The power sources 206 may provide alternating current ("AC") or direct current ("DC"). The power units 106 may include power converters to convert AC to DC and/or DC to AC and/or to convert AC to AC and/or DC to DC.

The power controller 104 may be configured to monitor power characteristics at all suitable rack-level power solutions. For example, the power controller 104 may be configured to monitor power quality received from the power sources 206. If one of the power sources 206 were to fail or begin delivering poor quality power, the power controller 104 can detect this change in conditions and determine an appropriate response (e.g., switch power to a battery backup unit of the power units 106). As an additional example, the power controller 104 may be configured to monitor power quality output from the power units 106. If one of the power units 106 were to fail or being outputting poor quality power, the power controller 104 can detect this change in power conditions and determine an appropriate response (e.g., switch power to a battery backup unit of the power units 106). As additional examples, the power controller 104 may be configured to monitor power quality input to the power units 106, power input to the server computers 202, and at any other suitable location within the system 200. In some examples, one of the power units 106 may be designated as a master power unit, which is configured to manage the operation of the other power units 106. For example, the master power unit may perform operations similar to the power controller 104 (e.g., distribute firmware update modules, etc.).

The power controller 104 may share a network connection with each of the management components 204. This may enable the power controller 104 to communicate with the management components 204 (e.g., receive information from the management components 204 and send instructions to the management components 204). In some examples, the power controller 104 communicates with the management components 204 to determine power characteristics of the system 200. For example, the management components 204 may include sensors to track in real-time power demand of each of the server computers 202. This information can be used to determine a load per server computer 202, load per shelf, load per rack, etc. In some examples, the power characteristic information can be used to make decisions about how to update the firmware on the power units 106. For example, it may be determined that, given a real-time load on a particular server computer 202, a maximum operational voltage of a battery backup type power unit 106 should be increased or decreased. This update can be achieved using the techniques described herein by adjusting a configuration parameter corresponding to the maximum operational voltage.

The power controller 104 may also share a network connection with a network switch 208. This may enable the power controller 104 to communicate with the external computing system 108. Such communication may enable the power controller 104 to receive firmware update instructions and firmware update modules relating to updating the power units 106. In some examples, the power controller 104 may maintain locally and/or access local configuration files about the power units 106 and the server computers 202 without having to contact the external computing system 108. In some examples, the power controller 104 contacts the external computing system 108 periodically and/or in accordance with a subscription model.

During this contact, the power controller 104 can request firmware update instructions for the power units 106.

In some examples, a single power supply type power unit 106 and a single battery backup type power unit 106 are configured to provide power to a single server component 202a. In this manner, the power units 106 share electrical connections with the server computer 202. A battery backup type power unit 106 and a power supply type power unit 106 may be interconnected with the server computer 202 via a hardware switch. For example, a three-leg switch may be provided, with the server computer 202 connected to a first leg and the two different types of power units 106 connected to the other two legs. When the power supply type power unit 106 fails or is otherwise offline (e.g., no power from the power sources 206), the switch may automatically begin transferring power from the battery backup type power unit 106. In some examples, a single power unit 106 may provide power to more than one server computer 202.

The external computing system 108 is connected to the power controller 104 via the network switch 208. In some examples, the external computing system 108 is also connected to the various server computers 202 via the network switch 208 or other network interface. The external computing system 108 may maintain a database 210 of firmware information. The firmware information relates to current firmware versions, current parameter values, and the like relating to the firmware operating on the power units 106. An administrator or other authorized user may use the external computing system 108 to create firmware updates for the power units 106. Part of this action may involve accessing and, in some examples, updating the information in the firmware information database 210. In some examples, after a firmware module has been loaded by a power unit 106, the power unit 106 may send a confirmation message via the power controller 104 to the external computing system 108. Using this message, the external computing system 108 may update the information in the firmware information database 210.

Figure 3:
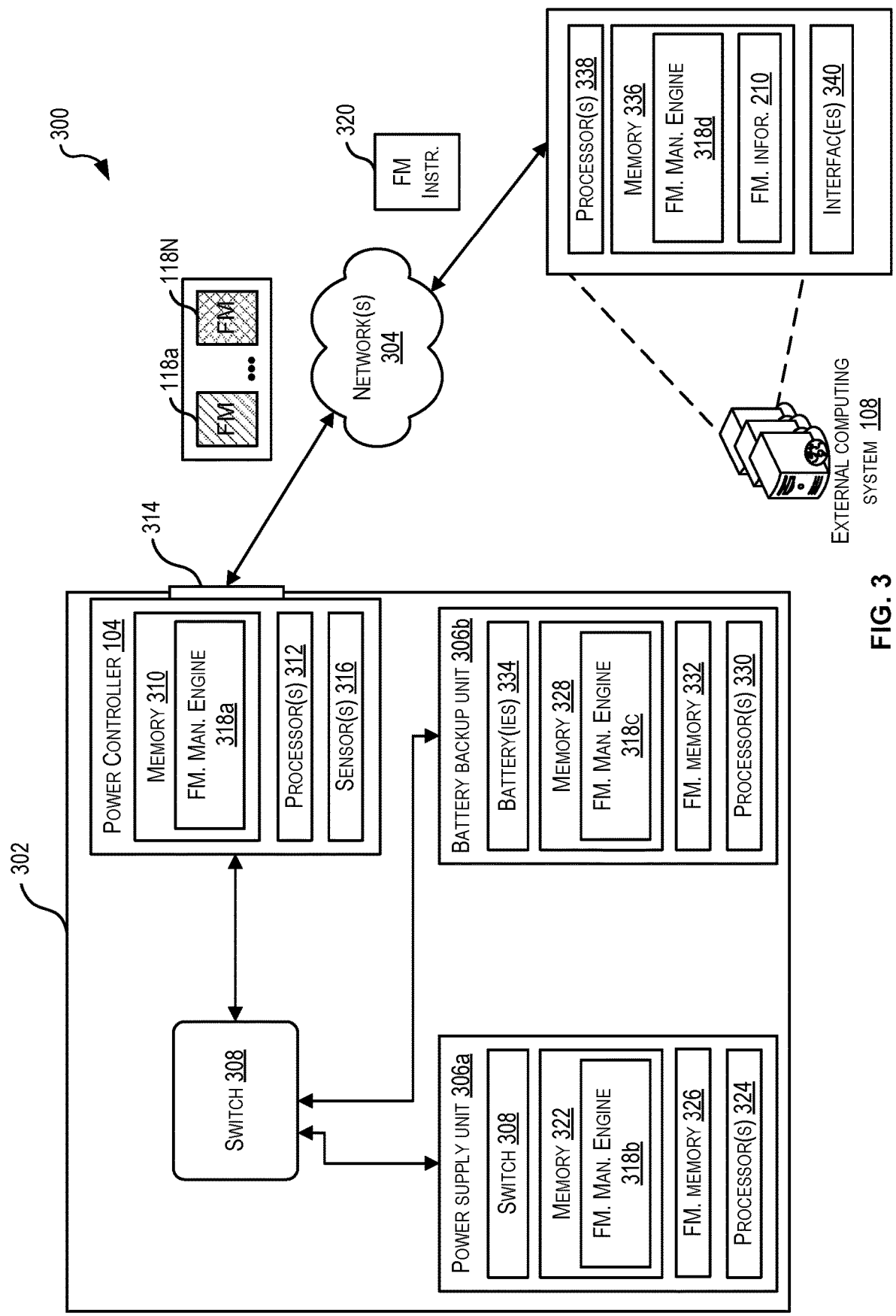
FIG. 3 is an example block diagram depicting an example system for implementing techniques relating to updating portions of firmware on power units, according to at least one example.

FIG. 3 is an example system 300 for implementing techniques relating to updating portions of firmware on power units, according to at least one example. The system 300 may include a power management server computer system 302. The power management server computer system 302 may represent a more detailed view of the power controller 104 and respective power units 106 illustrated in FIG. 2. The power management server computer system 302 may be in network communication via one or more networks 304 with the external computer system 108. The network(s) 304 may include the Internet, cellular networks, cable networks, fiber networks, local area networks, an intranet, wide area network, and other public and/or private network. As discussed with reference to FIG. 2, the external computing system 108 may communicate with the power controller 104—a component of the power management server computer system 302—via the network switch 208.

The power management server computer system 302 may include the power controller 104 and power units such as a power supply unit 306a and a battery backup unit 306b, both of which are examples of the power units 106. The power units 306a, 306b may use firmware to operate appropriately. The power management server computer system 302 may also include a hardware switch 308 by which the power controller 104 and power units 306a, 306b are electrically connected. For example, the hardware switch 308 may be an automatic transfer switch ("ATS") configured to automatically switch between power sources as appropriate (e.g., the power supply unit 306a and the battery backup unit 306). In some examples, the hardware switch 308 may be combined with the power supply unit 306a.

In some examples, the power management server computer system 302 may include a system board (e.g., motherboard, mainboard, etc.) by which the components described are electrically coupled. In some examples, the power management server computer system 302 is a server. In some examples, the components may be connected via cables and other suitable transport medium.

The power controller 104 may include any suitable computing device capable of performing the techniques described herein. For example, the power controller 104 can include a memory 310, a processor 312, interface(s) 314, and sensor(s) 316. The power controller 104 may be held in a chassis that includes the power units 306a, 306b. Thus, in at least some examples, the server computers 202 receive power from power supplies that are not within the chassis of the server computers 202. The power controller 104 may be configured to monitor power characteristics at all suitable rack-level power solutions including, for example, the power units 306a, 306b, the power sources 206, the server computers 202, and any other suitable location where power is transferred or received in the system 300.

The memory 310 stores processor instructions (e.g., a firmware manager engine 318a) and/or any other appropriate values, parameters, or information (e.g., firmware update information) utilized by the firmware manager engine 318a during operation. For example, the memory 310 may store characterizing information of the firmware of the power units 306 and other components of the power management server computer system 302.

The firmware manager engine 318a may include a trusted platform module ("TPM") or other comparable module to establish a secure connection or other trusted domain with the external computing system 108. This may include any suitable authentication and/or encryption approach such as, for example, public key cryptography, symmetric or asymmetric key cryptography, any other approaches for establishing and maintaining a secure connection.

In some examples, the firmware manager engine 318a may also be configured to request, download, store, and manage the firmware modules 118 from the external computing system 108. The firmware manager engine 318a may also be configured to request, download, store, and manage firmware instructions 320. The firmware instructions 320, which may include a firmware manifest or other data structure, may include information to enable the firmware manager engine 318a to identify the power units 306 and determine what, if any, firmware modules 118 should be loaded and/or updated by the power units 306.

The memory 310 may represent any collection and arrangement of volatile or nonvolatile, local or remote devices suitable for storing data. Examples of the memory 310 include, but are not limited to, random access memory ("RAM") devices, read only memory ("ROM") devices, magnetic storage devices, optical storage devices or any other suitable data storage devices.

The power controller 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory ("SRAM"), dynamic random access memory ("DRAM"), or ROM.

The processor 312 is operable to execute instructions associated with the functionality provided by the firmware manager engine 318a. The processor 312 may include one or more general purpose computers, dedicated microprocessors, or other processing devices capable of communicating electronic information. Examples of the processor 312 include one or more application-specific integrated circuits ("ASICs"), field programmable gate arrays ("FPGAs"), digital signal processors ("DSPs"), microprocessors, microcontrollers, and any other suitable specific or general purpose processors. Thus, the processor 312 may be implemented as appropriate in hardware, computer-executable instructions, software, firmware, or combinations thereof. Computer-executable instruction, software, or firmware implementations of the processor(s) may include computer-executable or machine-executable instructions written in any suitable programming language to perform the various functions described.

The sensor 316 enable the power controller 104 to monitor aspects of the power units 306. In particular, the sensors 316 may sense quality of power provided by the power units 306. In some examples, the sensors 316 are located at the power units 306 and/or split between the power controller 104 and the power units 306. The power controller 104 may use sensor information gathered by the sensors 316 in order to implement the techniques described herein.

The interfaces 314 include a network interface (e.g., the network switch 208) and any other suitable interface for enabling communication with the power controller 104 (e.g., a web interface, application programmatic interface, etc.).

In some examples, at least some of the components of the power management server computer system 302 are interconnected using one or more serial buses such as an inter-integrated circuit (e.g., I²C Bus). Such a serial bus may be synchronous, multi-master, multi-slave, packet switched, and single-ended. In some examples, the power management server computer system 302 may be considered a console network. Communications via the components of the power management server computer system 302 may be according to a console network protocol, which may correspond to a communication protocol of the serial buses (e.g., I²C protocol). This protocol may be different than protocol(s) used to communicate with the external computing system 108 via the networks 304.

The power unit 306a (e.g., a power supply type power unit) may include any suitable computing device capable of performing the techniques described herein. For example, the power unit 306a can include the switch 308 (e.g., when included to form an ATS/power supply unit ("PSU")), a memory 322, a processor 324, and firmware memory 326.

The memory 322 stores processor instructions (e.g., a firmware manager engine 318b) and/or any other appropriate values, parameters, or information (e.g., firmware update information) utilized by the firmware manager engine 318b during operation. For example, the memory 322 may store characterizing information of the firmware of the power units 306 and other components of the power management server computer system 302.

In some examples, the firmware manager engine 318b may also be configured to apply firmware modules 118 by loading the firmware modules 118 using the processor 324. This may include writing data to the firmware memory 326 to update the firmware stored in the firmware memory 326.

The memory 322 and the firmware memory 326 may represent any collection and arrangement of volatile or nonvolatile, local or remote devices suitable for storing data. Examples of the memories 322, 326 include, but are not limited to, RAM devices, ROM devices, magnetic storage devices, optical storage devices or any other suitable data storage devices.

The processor 324 is operable to execute instructions associated with the functionality provided by the firmware manager engine 318b. The processor 324 may include one or more general purpose computers, dedicated microprocessors, or other processing devices capable of communicating electronic information. Examples of the processor 324 include one or more ASICs, FPGAs, DSPs, microprocessors, microcontrollers, and any other suitable specific or general purpose processors. Thus, the processor 324 may be implemented as appropriate in hardware, computer-executable instructions, software, firmware, or combinations thereof. Computer-executable instruction, software, or firmware implementations of the processor(s) may include computer-executable or machine-executable instructions written in any suitable programming language to perform the various functions described.

The power unit 306b (e.g., a battery backup type power unit) may include any suitable computing device capable of performing the techniques described herein. For example, the power unit 306b can include a memory 328, a processor 330, firmware memory 332, and one or more battery(ies) 334.

The memory 328 stores processor instructions (e.g., a firmware manager engine 318c) and/or any other appropriate values, parameters, or information (e.g., firmware update information) utilized by the firmware manager engine 318c during operation. For example, the memory 328 may store characterizing information of the firmware of the power units 306 and other components of the power management server computer system 302.

In some examples, the firmware manager engine 318c may also be configured to apply firmware modules 118 by loading the firmware modules 118 using the processor 330. This may include writing data to the firmware memory 332 to update the firmware stored in the firmware memory 332.

The memory 328 and the firmware memory 332 may represent any collection and arrangement of volatile or nonvolatile, local or remote devices suitable for storing data. Examples of the memories 328, 332 include, but are not limited to, RAM devices, ROM devices, magnetic storage devices, optical storage devices or any other suitable data storage devices.

The processor 330 is operable to execute instructions associated with the functionality provided by the firmware manager engine 318c. The processor 330 may include one or more general purpose computers, dedicated microprocessors, or other processing devices capable of communicating electronic information. Examples of the processor 330 include one or more ASICs, FPGAs, DSPs, microprocessors, microcontrollers, and any other suitable specific or general purpose processors. Thus, the processor 330 may be implemented as appropriate in hardware, computer-executable instructions, software, firmware, or combinations thereof. Computer-executable instruction, software, or firmware implementations of the processor(s) may include computer-executable or machine-executable instructions written in any suitable programming language to perform the various functions described.

The battery(ies) 334 may include any suitable backup battery capable of powering one or more server computers 202. Suitable batteries may include lithium ion, wet cell lead-acid, nickel cadmium, and any other suitable battery configurable to provide power to one or more server computers 202.

Turning now to the external computing system 108, the external computing system 108 may include memory 336 (e.g., RAM and/or ROM), processor(s) 338 (e.g., CPU), interfaces 340, and the like. The processors 338 may be implemented as appropriate in hardware, computer-executable instructions, software, firmware, or combinations thereof. Computer-executable instruction, software, or firmware implementations of the processor may include computer-executable or machine-executable instructions written in any suitable programming language to perform the various functions described. In some examples, the external computing system 108 may include a firmware manager engine 318d stored in the memory 336 and executable by the processor 338. The memory 220 may also include the firmware information database 210, which may be stored in a data store. The firmware manager engine 318d may include functionality similar to the other instances of the firmware manager engine 318 described herein. In some examples, the firmware manager engine 318d is used by an administrator to manage firmware updates within the system 300 (e.g., the power management server computer system 302 and other power management server computer systems). For example, the firmware manager engine 318d may be used to define which power units 306 should include firmware modules including updates, patches, and/or replacement firmware. This can include identifying configuration parameters and associated values for updating. This information, along with information about the firmware modules and the power units 306, may be included in the firmware instructions 320.

The interface(s) 340 may be configured to enable creation of the firmware modules 118. For example, the firmware manager engine 318d may be used in connection with a user interface (e.g., graphical, command, etc.) to generate the firmware instructions 320 and create the package that includes the firmware modules 118.

FIGS. 4, 5, 6, and 7 illustrate example flow diagrams showing respective processes 400, 500, 600, and 700 as described herein. These processes 400, 500, 600, and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 4:
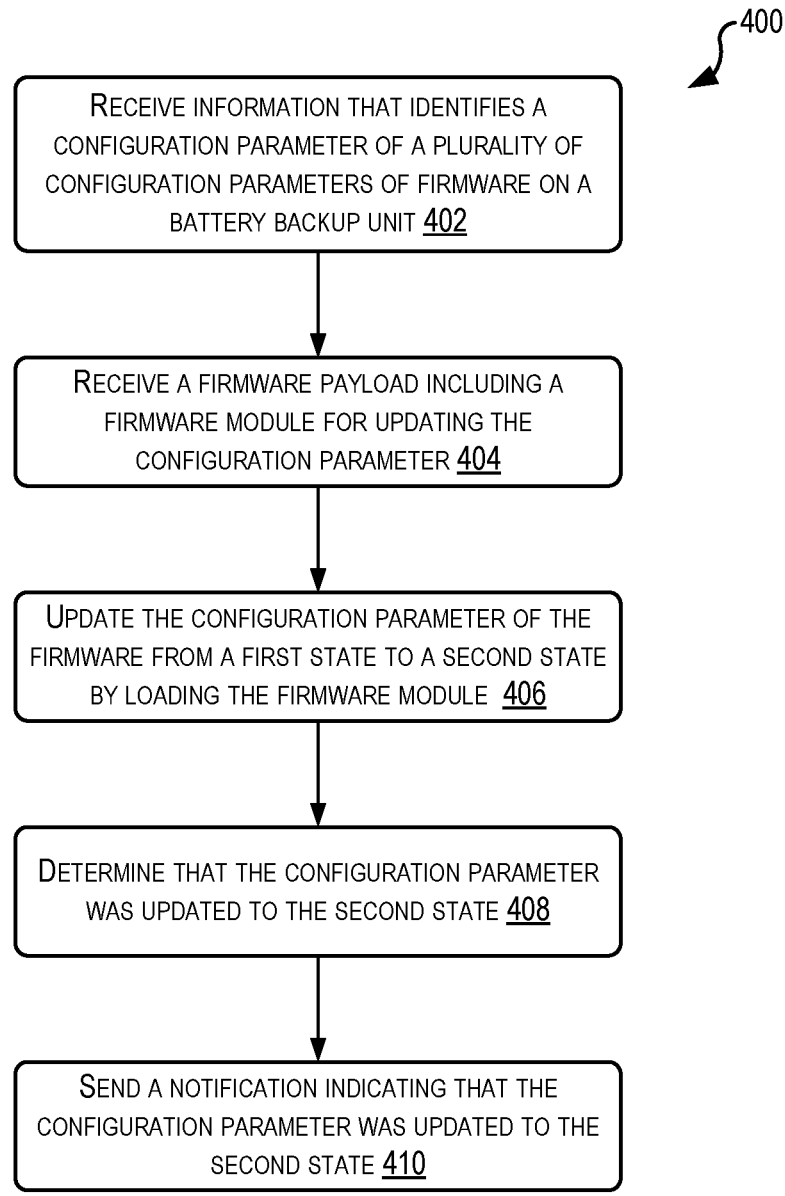
FIG. 4 is an example flow diagram depicting example acts for implementing techniques relating to updating portions of firmware on power units, according to at least one example.

FIG. 4 is flow diagram of process 400 depicting example acts for implementing techniques relating to updating portions of firmware on power units, according to at least one example. The firmware manager engine 318 (FIG. 3), whether embodied in the power controller 104 (FIG. 1) or one of the power units 306 (FIG. 3), may perform the process 400.

The process 400 may begin at 402 by receiving information that identifies a configuration parameter of a plurality of configuration parameters of a firmware on a battery backup unit. In some examples, this information may be received from a power shelf controller. The power shelf controller may obtain the information from an external computer system via a network connection. In some examples, the configuration parameter may correspond to the operation of the battery backup unit.

At 404, the process 400 may include receiving a firmware payload including a firmware module for updating the configuration parameter. In some examples, the firmware payload may be received from the power shelf controller. The firmware update module may be received by the power shelf controller from the external computer system.

At 406, the process 400 may include updating the configuration parameter of the firmware from a first state to a second state by loading the firmware module. In some examples, loading the firmware module may include writing data to a firmware memory corresponding to the configuration parameter in the second state. The firmware memory may be included in the battery backup unit.

In some examples, updating the configuration parameter may include updating the configuration parameter without updating other configuration parameters of the plurality of configuration parameters. In this manner, a portion of the firmware is updated while other portions are not updated.

At 408, the process 400 may include determining that the configuration parameter was updated to the second state. This may include reading data in a firmware memory to confirm that a value of the configuration parameter corresponds to the second state. For example, this may include checking the addressable memory stored at the power unit or elsewhere.

At 410, the process 400 may include sending a notification indicating that the configuration parameter was updated to the second state. In some examples, the notification may be sent to the power shelf controller.

In some examples, the process 400 further includes establishing a secure network connection with the external computing system. In this example, the firmware update may be received via the secure network connection.

Figure 5:
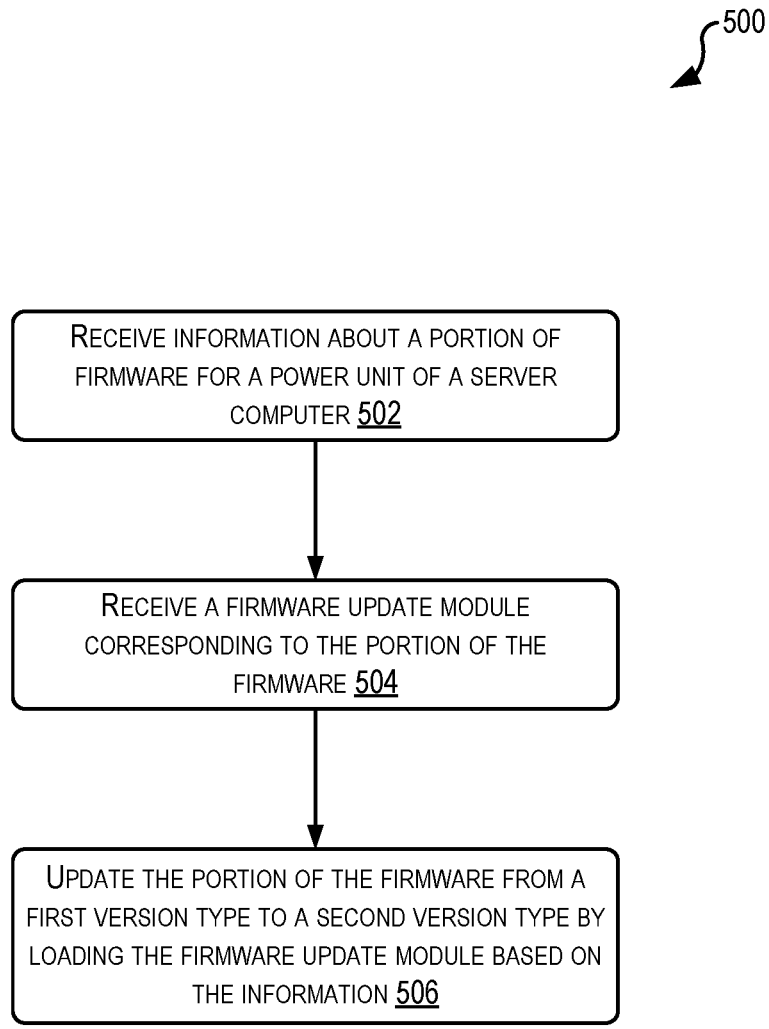
FIG. 5 is an example flow diagram depicting example acts for implementing techniques relating to updating portions of firmware on power units, according to at least one example.

FIG. 5 is flow diagram of process 500 depicting example acts for implementing techniques relating to updating portions of firmware on power units, according to at least one example. The firmware manager engine 318 (FIG. 3), whether embodied in the power controller 104 (FIG. 1) or one of the power units 306 (FIG. 3), may perform the process 500.

The process 500 may begin at 502 by receiving information about a portion of firmware for a power unit of a server computer. In some examples, the portion of the firmware may be of a first version type. In some examples, power unit may be a battery backup unit or a power supply unit. In some examples, receiving the information about the portion of the firmware may include receiving the information from a power shelf controller associated with the power unit. The information may identify an address range in a firmware memory to be updated.

In some examples, the portion of the firmware includes a configuration parameter of the power unit. In this example, the configuration parameter may be associated with a battery operation algorithm of the power unit.

At 504, the process 500 may include receiving a firmware update module corresponding to the portion of the firmware. In some examples, the firmware update module may be of a second version type. The second version type may be different from the first version type. In some examples, receiving the firmware update module may include receiving the firmware update module from a power shelf controller associated with the power unit.

In some examples, the firmware update module is determined based at least in part on power consumption information associated with a computer system including the power unit.

At 506, the process 500 may include updating the portion of the firmware from a first version type to a second version type by loading the firmware update module based on the information. In some examples, updating the portion of the firmware may include updating the portion of the firmware without powering off the power unit.

In some examples, the portion of the firmware is one of a plurality of portions of the firmware. In this example, updating the portion of the firmware at 506 may include updating the portion of the firmware without updating other portions of the plurality of portions.

In some examples, the process 500 may further include storing the firmware update module in a firmware memory of the power unit. In this example, loading the firmware update module at 506 may include loading the firmware update module from the firmware memory.

In some examples, the process 500 may further include verifying the firmware update module prior to updating the portion of the firmware. This may include confirming that version history matches an expected version history. In some examples, verifying the firmware update module can also include verifying whether the entity that created the firmware modules is a trusted entity (e.g., is on a white list of entities). In some examples, verifying the update module can also include scanning the code that makes up the firmware update module to determine whether potential threats (e.g., nefarious code) are present. In some examples, verifying the firmware update module can also include simulating loading the code in a safe mode of an operating system. In some examples, verifying the firmware update module can also include determining whether the firmware update module properly corresponds to the actual computer components of the computer system. In some examples, verifying the firmware update module can also include comparing the firmware update module to existing firmware components (e.g., the portion of the firmware) to identify differences between the new and the existing. These differences may inform the system whether the firmware update module should be implemented. In some examples, authenticating the firmware update module may be based on the firmware instructions. For example, a checksum operation may be performed with respect to the firmware instructions and the firmware update module.

Figure 6:
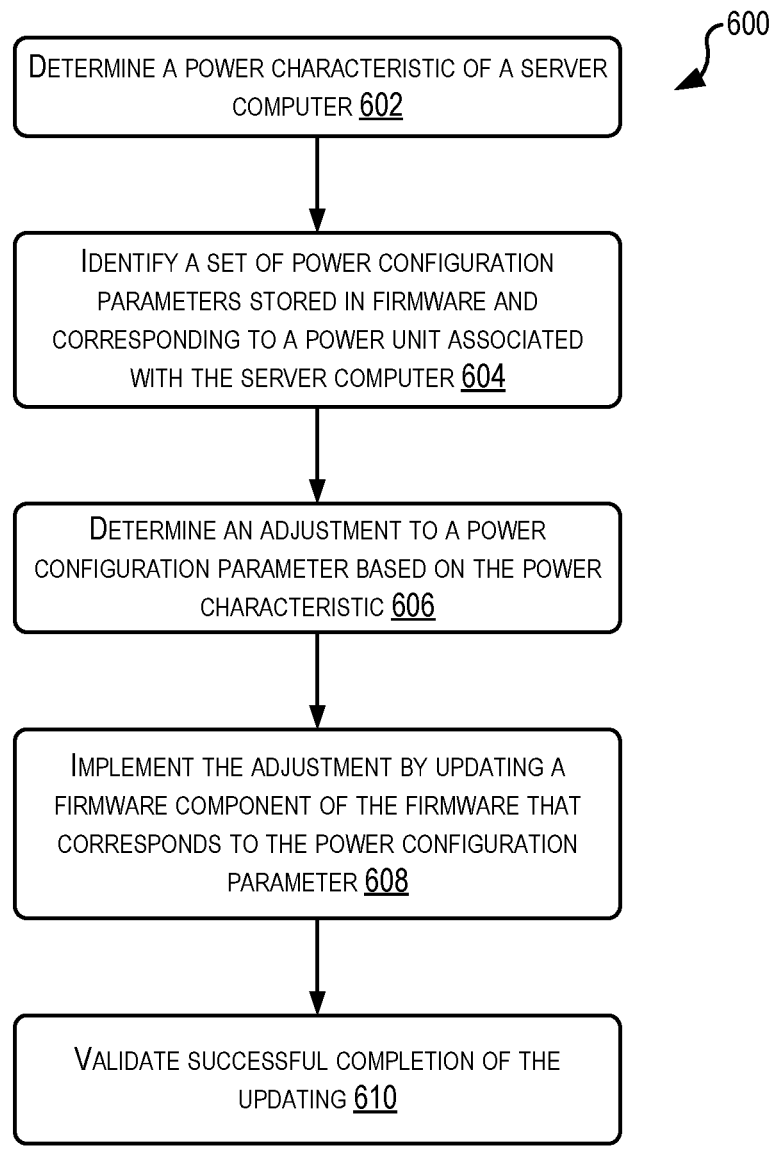
FIG. 6 is an example flow diagram depicting example acts for implementing techniques relating to updating portions of firmware on power units, according to at least one example.

FIG. 6 is flow diagram of process 600 depicting example acts for implementing techniques relating to updating portions of firmware on power units, according to at least one example. The firmware manager engine 318 (FIG. 3), whether embodied in the power controller 104 (FIG. 1) or one of the power units 306 (FIG. 3), may perform the process 600.

The process 600 may begin at 602 determining a power characteristic of a server computer. This may include, for example, accessing information generated by one of the management components 204. Such information may indicate a real-time power characteristic of the server computer. For example, a total power demand of the server computer can be determined. In some examples, other power characteristics can be determined (e.g., idle power requirements, minimum power requirements, peak power requirements, time periods for each of the power requirements, and any other suitable power characteristic). In some examples, the power controller 104 includes the capability of determining the power characteristic. When the process 600 is performed by a power unit, determining the power characteristic may include receiving the power characteristic from one of the devices that determines the power characteristic (e.g., based on sensor information that senses data of components of the server computer).

At 604, the process 600 may include identify a set of power configuration parameters stored in firmware and corresponding to a power unit associated with the server computer. The set of power configuration parameters may correspond to a battery algorithm and any other parameters relating to the operation of the power unit.

At 606, the process 600 may include determining an adjustment to a power configuration parameter based on the power characteristic. In some examples, this may include determining a value of the power configuration parameter to change. The value may be determined based on the power characteristic. In this manner, the configuration parameters can be updated in about real time based on the power characteristic that is computed, determined, and/or accessed in any suitable manner.

At 608, the process 600 may include implementing the adjustment by updating a firmware component of the firmware that corresponds to the power configuration parameter. This may include changing an existing value of the parameter to a determined value identified in the adjustment.

At 610, the process 600 may include validating successful completion of the updating. In some examples, this may include confirming that the value of the parameter was updated to the new value.

Figure 7:
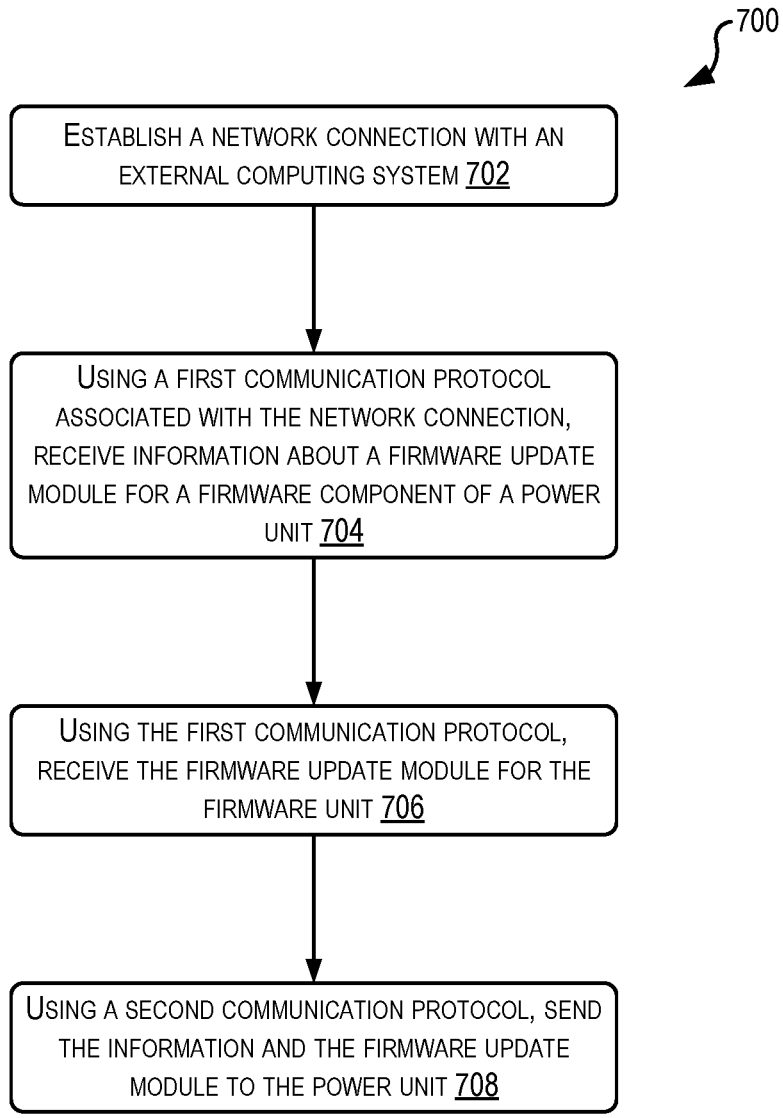
FIG. 7 is an example flow diagram depicting example acts for implementing techniques relating to communicating with a power unit, according to at least one example.

FIG. 7 is flow diagram of process 700 depicting example acts for implementing techniques relating to communicating with a power unit, according to at least one example. The firmware manager engine 318 (FIG. 3), whether embodied in the power controller 104 (FIG. 1) or one of the power units 306, may perform the process 700.

The process 700 may begin at 702 by establishing a network connection with an external computing system. In some examples, this may include establishing a secure connection, which may include establishing a secure network connection with the external computing system. In some examples, the secure connection may be established using a cryptographic process.

At 704, the process 700 may include, using a first communication protocol associated with the network connection, receiving information about a firmware update module for a firmware component of a power unit. In some examples, this information can be received from the external computer system via the network connection. The first communication protocol may be one that is appropriate for the network connection (e.g., transmission control protocol ("TCP"), wireless TCP, user datagram protocol ("UDP"), reliable user datagram protocol ("RUDP"), stream control transmission protocol ("SCTP"), or other network-based protocol).

At 706, the process 700 may include, using the first communication protocol, receiving the firmware update module for the firmware unit. In some examples, the firmware update module can be received from the external computer system via the network connection. In some examples, blocks 704 and 706 are combined in one communication. In some examples, the information received at 704 is used to request the firmware update module. In this example, the communication at 706 may be responsive to a request to the external computing system.

At 708, the process 700 may include, using a second communication protocol, sending the information and the firmware update module to the power unit. In some examples, the second communication protocol may be any suitable protocol for communicating within a console network (e.g., I$^2$C protocol, serial peripheral interface protocol ("SPI"), universal asynchronous receiver/transmitter protocol ("UART"), controller area network protocol ("CAN"), and any other protocol suitable for communicating within the console network). In some examples, the second communication protocol may be associated with a power shelf system that implements the console network that includes any suitable combination of devices, components, buses, circuits, etc. For example, the power controller may communicate with the external computing system using a network protocol (e.g., first communication protocol) and may communicate with the power unit using a different protocol (e.g., console communication protocol). In some examples, use of the two protocols may improve security of transferring firmware modules.

In some examples, a power unit is operational during blocks 702 and 704, but turned off during the block 706.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are to be regarded in an illustrative rather than a restrictive sense. It will, however, be evident that various modifications and changes may be made thereunto without departing from the broader spirit and scope of the disclosure as set forth in the claims. Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A power management system, comprising:
a power shelf controller comprising a first firmware manager engine configured to receive firmware updates from an external computing system;
a switch electrically connected to the power shelf controller; and
a battery backup unit that is separate from the power shelf controller and comprises batteries electrically connected to the switch, the battery backup unit comprising firmware and a second firmware manager engine configured to:
receive, from the power shelf controller, information that identifies a value of a configuration parameter of a plurality of configuration parameters of the firmware on the battery backup unit, the firmware comprising a battery gauge algorithm to output data about operation of the batteries in the battery backup unit, the plurality of configuration parameters comprising a maximum power of the battery backup unit, a total time the battery backup unit can power a server computer, and a temperature of the battery backup unit, wherein the plurality of configuration parameters are parameters of the battery gauge algorithm and the configuration parameter comprises less than all of the firmware;
receive, from the power shelf controller, a firmware module comprising a firmware update for updating the configuration parameter;
update the value of the configuration parameter of the firmware from a first state to a second state by loading the firmware module and without updating other configuration parameters of the plurality of configuration parameters;
determine that the value of the configuration parameter was updated to the second state; and
send a notification to the power shelf controller indicating that the value of the configuration parameter was updated to the second state.

2. The power management system of claim 1, wherein the configuration parameter relates to operation of the battery backup unit.

3. The power management system of claim 1, wherein:
the battery backup unit further comprises a nonvolatile firmware memory in which is stored the firmware; and
loading the firmware module comprises writing data to the nonvolatile firmware memory corresponding to the configuration parameter in the second state.

4. The power management system of claim 1, wherein:
the power shelf controller is further configured to establish a secure network connection with the external computing system, the firmware module comprising the firmware update being received via the secure network connection according to a network communication protocol; and
receiving the firmware module comprises receiving the firmware module according to a console communication protocol.

5. The power management system of claim 1, further comprising a management component configured to sense power characteristic information of a server computer that is electrically connected to the power shelf controller, and wherein the power shelf controller is configured to, prior to the battery backup unit updating the value of the configuration parameter, determine the firmware module based at least in part on the power characteristic information.

6. The power management system of claim 1, wherein the firmware further comprises a control algorithm and a safety algorithm.

7. The power management system of claim 6, wherein the configuration parameters are parameters of the control algorithm and the safety algorithm.

8. The power management system of claim 1, wherein each of the plurality of configuration parameters comprises a value, and wherein the second firmware manager engine is configured to update respective values of each of the plurality of configuration parameters.

9. A computer-implemented method, comprising:
receiving, from a power shelf controller, information about a portion of a firmware image for a power unit of a server computer, the portion of the firmware image being of a first version type and comprising a battery gauge algorithm to output data about operation of the power unit and a value of a configuration parameter of a plurality of configuration parameters, wherein the plurality of configuration parameters are parameters of the battery gauge algorithm and comprise a maximum power of the power unit, a total time the power unit can power the server computer, and a temperature of the power unit, and wherein the configuration parameter comprises less than the whole firmware image and the power shelf controller is separate from the power unit and electrically connected to the power unit via a switch;
receiving, from the power shelf controller, a firmware update module for the portion of the firmware image, the firmware update module being of a second version type; and
updating the value of the configuration parameter of the power unit from the first version type to the second version type by loading the firmware update module into the power unit based on the information, wherein updating the value of the configuration parameter from the first version type to the second version type comprises updating the value of the configuration parameter without updating other configuration parameters of the whole firmware image.

10. The computer-implemented method of claim 9, wherein the power unit comprises a battery backup unit or a power supply unit.

11. The computer-implemented method of claim 9, further comprising storing the firmware update module in a firmware memory of the power unit.

12. The computer-implemented method of claim 11, wherein loading the firmware update module comprises loading the firmware update module from the firmware memory.

13. The computer-implemented method of claim 9, wherein the firmware update module is determined based on power consumption information associated with a computer system comprising the power unit.

14. The computer-implemented method of claim 9, further comprising verifying the firmware update module prior to updating the portion of the firmware image.

15. The computer-implemented method of claim 9, wherein updating the value of the configuration parameter comprises updating the value of the configuration parameter without powering off the power unit.

16. The computer-implemented method of claim 14, wherein verifying the firmware update module comprises at least one of comparing a version history of the firmware update module with a known history of the firmware update module, comparing a creation entity with known creation entities, or scanning code that makes up the firmware update module.

17. A battery backup unit, comprising:
firmware memory for storing a firmware program for operating a battery of the battery backup unit, the firmware program comprising a plurality of firmware portions; and
a processor configured to:
receive, from a computer device that is separate from the battery backup unit, a firmware update module;
determine a firmware portion of the plurality of firmware portions to which the firmware update module is applicable, the firmware portion comprising a battery gauge algorithm of the battery backup unit and a value of a configuration parameter of a plurality of configuration parameters of the battery gauge algorithm, wherein the plurality of configuration parameters comprise a maximum power of the battery backup unit, a total time the battery backup unit can power a server computer, and a temperature of the battery backup unit; and
update the firmware portion by writing data to the firmware memory based on the firmware update module, wherein updating the firmware portion comprises updating the value of the configuration parameter without updating other firmware portions of the plurality of firmware portions, and
wherein the battery backup unit is configured to electrically connect to the computer device via a switch.

18. The battery backup unit of claim 17, wherein:
the plurality of configuration parameters further comprises a voltage parameter or a power parameter for the battery.

19. The battery backup unit of claim 17, wherein the battery gauge algorithm comprises at least one of a battery gauge algorithm, a control algorithm, and a safety algorithm.

* * * * *